A. G. SEBERG.
ROCK AND BOULDER PLANER.
APPLICATION FILED APR. 10, 1911.
1,044,926.
Patented Nov. 19, 1912.
6 SHEETS—SHEET 3.
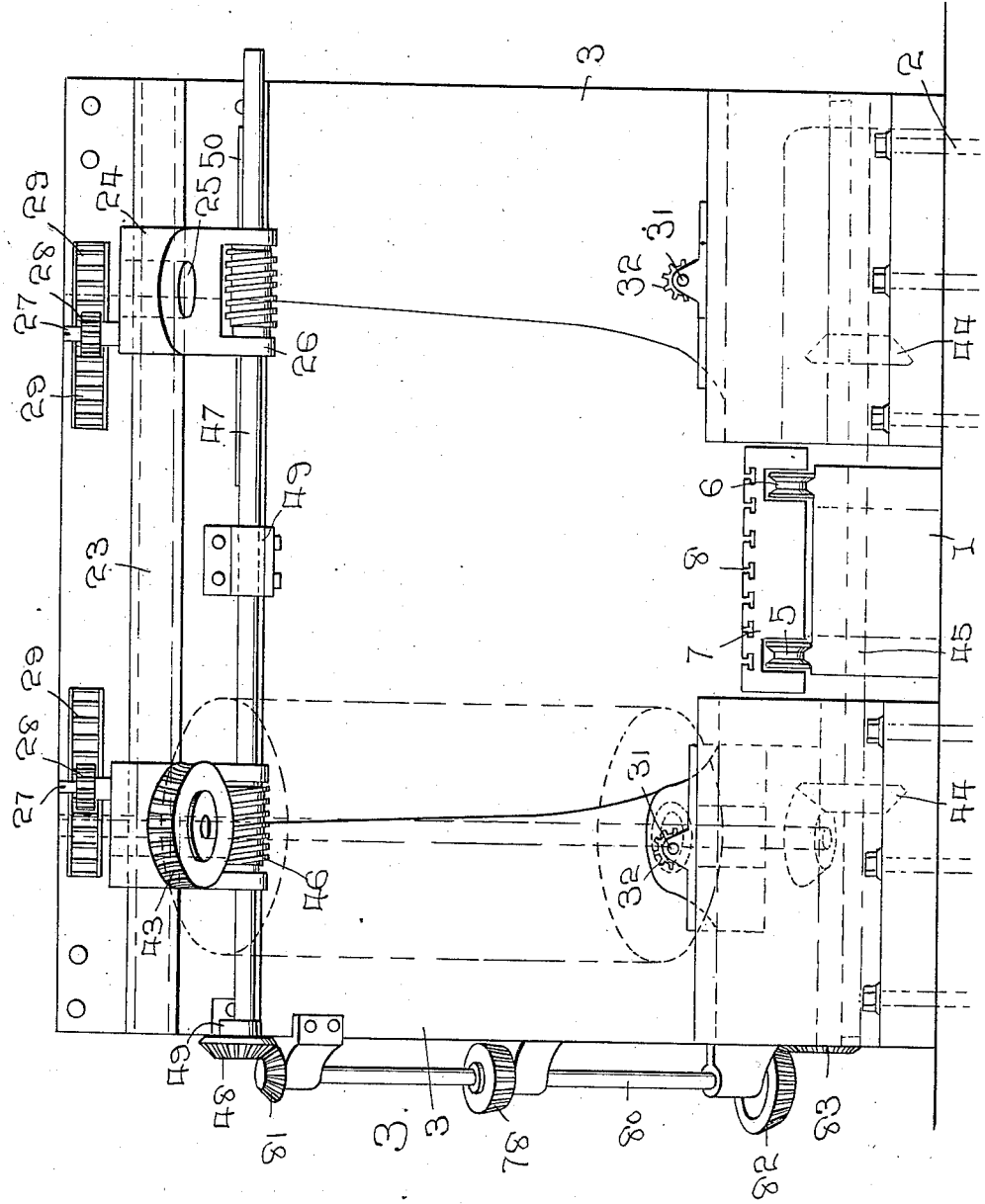

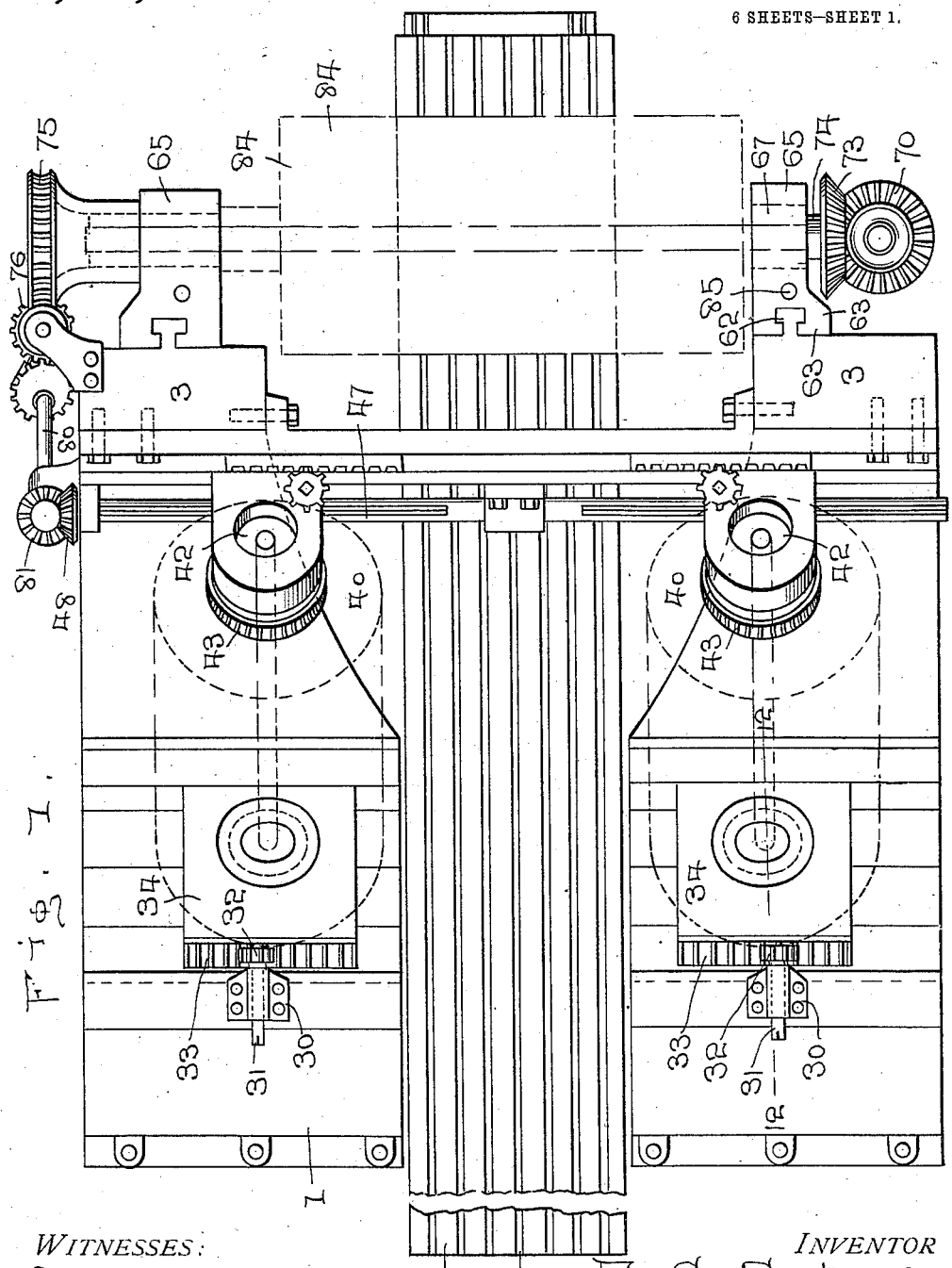

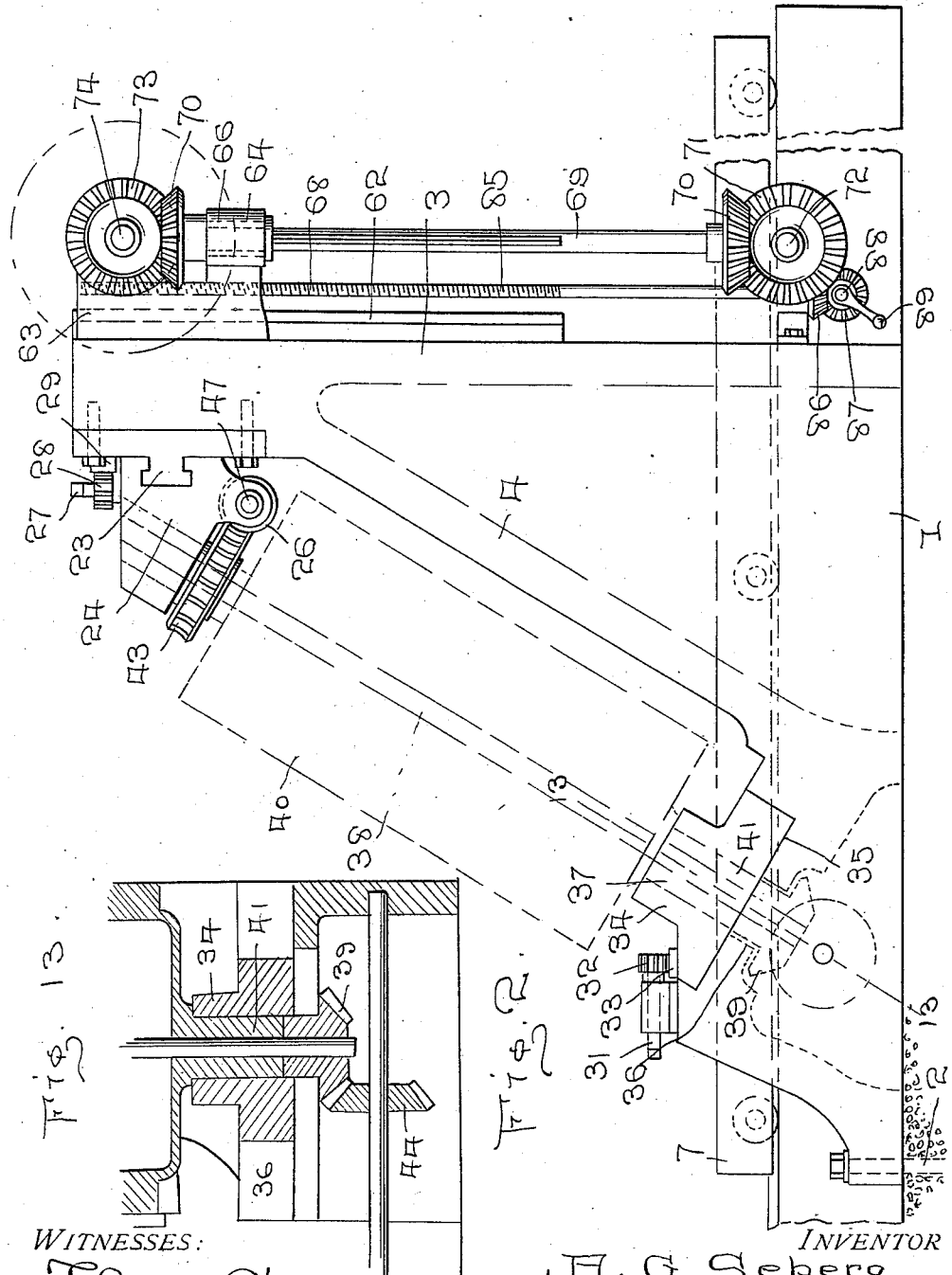

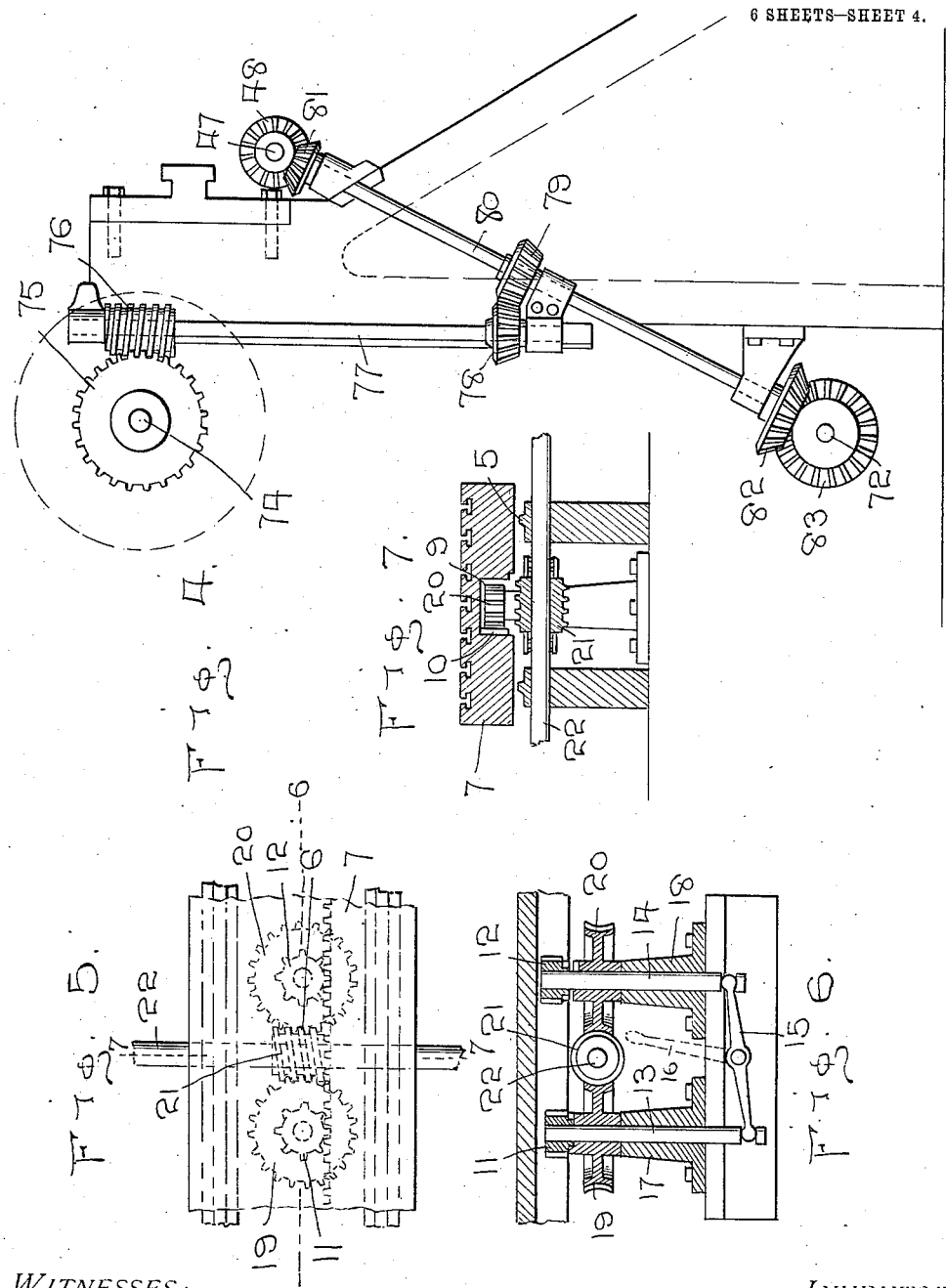

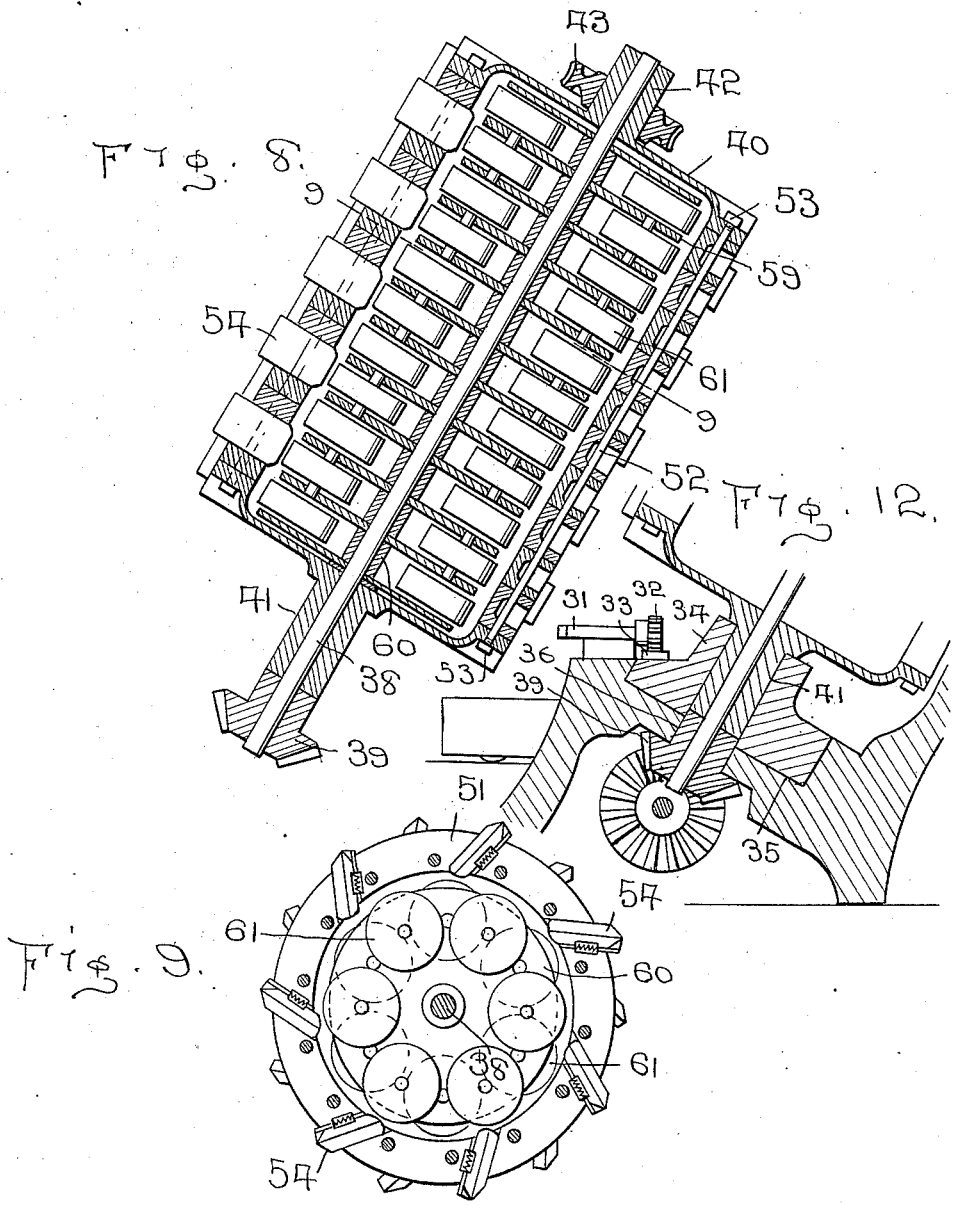

A. G. SEBERG.
ROCK AND BOULDER PLANER.
APPLICATION FILED APR. 10, 1911.
1,044,926.
Patented Nov. 19, 1912.
6 SHEETS—SHEET 6.
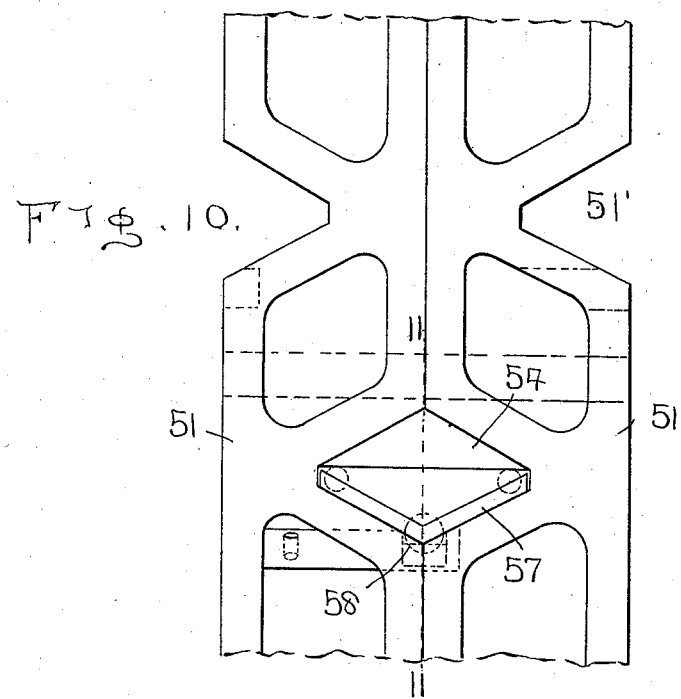
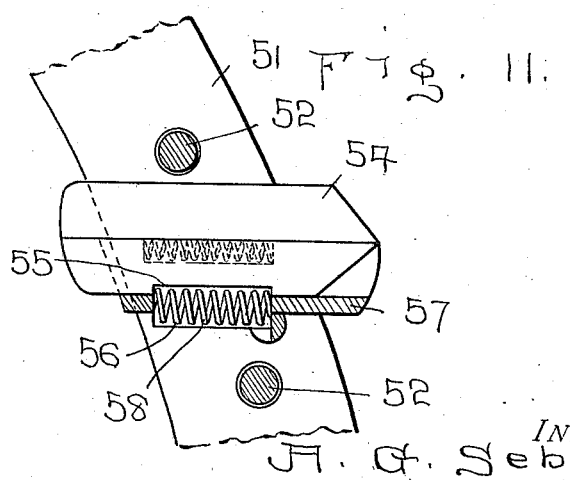

UNITED STATES PATENT OFFICE.

AARON G. SEBERG, OF RACINE, WISCONSIN.

ROCK AND BOULDER PLANER.

1,044,926.   Specification of Letters Patent.   Patented Nov. 19, 1912.

Application filed April 10, 1911. Serial No. 620,049.

*To all whom it may concern:*

Be it known that I, AARON G. SEBERG, a citizen of the United States, residing at Racine, in the county of Racine and State of Wisconsin, have invented certain new and useful Improvements in Rock and Boulder Planers; and I do hereby declare the following to be a full, clear, and exact description of the invention, such as will enable others skilled in the art to which it appertains to make and use the same.

This invention relates to rock or boulder working machines and more particularly to that class of stone working machines known as rock and boulder planers.

An object of the invention is to construct a machine which is adapted to plane rocks or boulders of various sizes and shapes.

Another object is to provide a machine of this character provided with a plurality of rotary tool holders adapted to hold chisels or other stone working tools to engage the various surfaces of the stone or boulder to be planed.

Another object is to provide a suitable movable platform adapted to support the rock to be worked, and means for supporting and oscillating the said platform.

Another object is to provide means for adjusting the positions of the tool holders in respect to the platform and also in respect to one another.

Still another object is to provide means for reversing the movement of the supporting platform.

A further object is to construct a machine of the above stated character provided with novel rotary tool holders carrying tools protruding therefrom positioned to either side of the platform and above the latter, said tools carried by said holders adapted to engage the sides and the top of the stone to be planed, planing the latter upon three surfaces with one operation of the machine.

A further object is to provide tool holders so constructed with hammers inwardly of the resiliently held tools that they may be rotated in the same direction as the portion of said holder supporting the tools and independently thereof to strike the inner ends of the tools to chisel or plane the rock, as they and the tools rotate, and means for rotating the tools at one rate of speed and the hammers at another rate of speed, and, A still further object is to provide a suitable frame work carrying supports and guides for the adjustable parts, and connections between the various parts to transmit power to the operative parts of the machine.

Other objects and advantages will be hereinafter set forth and pointed out in the specification.

In the accompanying drawings which are made a part of this application, Figure 1 is a top plan view of the complete machine. Fig. 2 is a side elevation thereof. Fig. 3 is a front view. Fig. 4 is a side view, looking at the side opposite that shown in Fig. 2 (part of the machine being broken away). Fig. 5 is a fragmentary view of the movable platform and its reversing mechanism. Fig. 6 is a section on the line 6—6, Fig. 5. Fig. 7 is a transverse section on the line 7—7, Fig. 5. Fig. 8 is a longitudinal sectional view through one of the movable rotary tool carriers. Fig. 9 is a cross sectional view on the line 9—9, Fig. 8. Fig. 10 is an enlarged fragmentary view of the outer face of the tool holder, showing a chisel in its socket *a*. Fig. 11 is a fragmentary section on the line 11—11, Fig. 10. Fig. 12 is a sectional view taken on the line 12—12 of Fig. 1, and, Fig. 13 is a sectional view taken on the line 13—13 of Fig. 2.

Referring to the drawings in which similar reference numerals designate corresponding parts throughout the several views, 1 designates the base of the frame which is anchored preferably in a concrete base by means of suitable anchors 2.

Extending perpendicularly to the base 1 are the standards 3 to the upper ends of which are connected the diagonal bracing members 4, which have their lower ends connected with the base 1 toward the front end thereof. Upon the base 1 between the standards 3 are located the rails 5, upon which the wheels 6 of the platform 7 run. The platform 7 is provided with T-shaped slots in its upper surface, the purpose of which will later appear. These slots are designated by the numeral 8.

The platform 7 is provided in its under surface with the recess 9, upon one of the faces of which is carried the rack 10. The rack 10 is adapted to be engaged alternately by the pinions 11 and 12 carried upon the upper ends of the rods of the stub shafts 13 and 14, respectively. The stub shafts 13 and 14 are connected at their lower ends by the opposite ends of the rock arm 15 to which is secured the reversing handle 16.

The shafts 13 and 14 extend through boxings 17 and 18, respectively, and loosely mounted upon the shafts 13 and 14, resting upon the boxings 17 and 18, are the gear wheels 19 and 20, respectively. The openings 11 and 12 are adapted for locking engagement with the gear wheels 19 and 20, respectively, when said pinions are brought in engagement therewith by the rocking of the rock arm 15 through the medium of the handle 16 to draw the stub shaft to which the pinion is attached in a downward direction. Between the gears 19 and 20 is positioned a worm 21, which is in engagement with both of the wheels 19 and 20, and is rigidly carried upon the shaft 22. Thus it will be seen that by shifting the handle 16 to either side, one of the pinions will be engaged with its gear wheel and locked therewith for rotation to move the platform 7 through the medium of the rack 10, in a forward direction and by shifting the handle 16 to the opposite side, the first pinion will be thrown out of engagement with its gear wheel and the second pinion brought into locked engagement with its gear wheel to move the platform 7, through the medium of the rack 10, in the opposite direction.

Secured to the upper ends of the standards 3 and braces 4 is the T-shaped guide track 23, upon which are adapted to move the brackets 24, which are provided with the shaft openings 25 and the perforated ears 26 revolubly secured in the brackets 24 and extending upwardly therefrom are the pinion shafts 27, carrying the pinions 28, which are adapted to mesh with the tracks of the adjusting racks 29, which latter are carried by the T-track 23.

Upon the base 1 to either side of the platform 7 and above the latter are secured the bearings 30, through which extend the stub shafts 31 carrying the pinions 32 adapted to mesh with the racks 33 carried by the movable base-plates 34. The base-plates 34 are adapted to slide within the guide channels 35 of the base 1, said guide channels being at an angle to the platform 7, slanting downwardly and rearwardly, the straight portion of the slots 35 and the base-plate 34 being parallel with the under face of the brackets 24. The base-plates 34 are provided with circular apertures 37 in alinement with the shaft openings 25 of the brackets 24, the purpose of which will later appear. There are also provided through the base 1, oblong slots 36 through the central portion of the straight portion of the guide channels 35. These slots 36 and channels 35 extend transversely of the base 1.

Through the slots 36 and the circular openings 37 is the shaft 38, which has its upper end revolubly secured within the bearing opening 25 of the bracket 24. Rigidly secured upon the lower end of the shaft 38 is the bevel gear 39, and loosely mounted upon the shaft 38, between the bearing plate 34 and the bracket 24, is the tool holding casing 40 having the shaft surrounding portions 41 and 42 projecting from the opposite ends. The projecting portions 41 and 42 surround the shaft 38, and rigidly secured upon the portion 42 is the gear wheel 43 between the casing 40 and the bracket 24, the upward extremity of said portion 42 projecting into the bearing opening 25 of the bracket 24. The extension 41 is loosely held within the circular opening 37 of the base-plate 34. The bevel gear 39 is engaged by the bevel gear 44 carried upon the shaft 45 to be rotated to revolve the shaft 38.

The gear wheel 43 is engaged by the worm 46 carried by the shaft 47, which may be rotated by any suitable power and carries upon one end the bevel gear 48, the purpose of which will later appear. The shaft 47 extends transversely of the machine, and is positioned near the top of the frame work and carried in suitable bearing brackets 49. The worm 46, as will be noted, is slidably mounted upon the shaft 47 and is locked thereto by means of the integral keys or ridges 50, carried by said shaft, which engage within suitable slots in the inner surface of the slidable worms 46.

As will be noted, there are two shafts 38, one to each side of the platform 7, and a worm 46 is provided for each of the gear wheels 43. The shafts 45 and 47 are preferably rotated in the same direction, but at different speeds. The casing 40 is composed of circular sections 51 placed one upon the other and secured together by the rods 52 passing therethrough and having suitable fastenings means 53 upon their ends. The sections 51 are provided with V-shaped openings 51' in the opposite faces thereof, the V-shaped openings 51' registering to form diamond-shaped openings within which the chisel or other tool 54 may be positioned. The tools 54 are provided with U-shaped recesses 55 about midway their sharp edges. The slots 55 are adapted to register with similar slots 56 within the circular members 51 and the movable sockets 57. Within these registering openings are positioned the shock absorbing springs 58, which serve to absorb all shocks due to the sudden contact of the tools 54 with the stone being planed, and also prevent the tools 54 from becoming unseated.

Rigidly secured upon the shaft 38 inwardly of the members 51, are the disks 59 spaced from one another by means of the sleeves or spools 60. Revolubly mounted between the disks 59 are the spaced rotary hammers 61, each set of hammers being offset from the set above and the one below to strike between the strikes of the adjacent sets. One set of hammers is positioned opposite one set of tools 54 and are adapted to strike the inner ends of said tools when the outer ends or points thereof, are pressed inwardly against the tension of the spring 58, to chisel or plane the rock upon the platform 7. Thus, it will be seen that the hammers will only act upon the tools 54 when the latter engage against the surface of the rock and are forced inwardly thereby. As the casing 40 carrying the tools 54 is continually rotating and the hammers carried by the shaft 38 are also rotating, but at a greater rate of speed, the hammers 61 will engage in succession against the inner ends of the tools 54 as the latter are passing the side of the rock upon the platform 7 and will drive them against said rock each and every time that the tools are pressed inwardly by the adjacent rock. Thus, it will be seen that there will be a continuous hammering or chiseling of the rock as the parts are rotated.

It will be understood that as long as the tools 54 rest in their normal position their inner ends will not be engaged by the rotary hammers 61. As the surface of the rock is planed or chiseled the same may be moved either forward or backward upon the platform 7 by means of the platform operating mechanism previously described. If desired, however, the platform 7 supporting the rock to be planed may be moved in either direction during the planing of the rock to continually present a different portion to be planed.

It will be understood that the rock to be planed may be held in proper position upon the platform 7 by means of standards having lower T-shaped ends (not shown) to fit within the T-shaped grooves 8 or may be supported in any manner desired.

Vertically adjustable upon the T-guide 62 and extending rearwardly from the standards 3 are the brackets 63, having outwardly extending supporting arms 64 and 65, provided with bearing openings 66 and 67, respectively, at right angles to one another. The vertical shaft 69 is adapted to be supported by the arm 64 of one of the brackets 63, which carries upon its opposite ends the bevel gears 70. The lower gear 70 is adapted to mesh with the bevel gear 71 carried upon the transverse shaft 72 mounted in the base 1. The upper bevel gear 70 is adapted to mesh with the bevel gear 73 carried upon the horizontal shaft 74, which has upon its opposite end the gear 75 adapted to be engaged and rotated by the worm 76, slidably adjusted upon the short shaft 77, which carries near its lower end the bevel gear 78. The bevel gear 78 is engaged and rotated by the bevel gear 79 centrally mounted upon the diagonally extending shaft 80. The diagonal shaft 80 has upon its upper end the bevel gear 81, which is engaged and rotated by the bevel gear 48 upon the shaft 47.

Upon the lower end of the shaft 80 is secured the bevel gear 82 adapted to mesh with the bevel gear 83 upon the adjacent end of the shaft 72. The shaft 74 is similar to the shaft 38 and has mounted thereupon between the brackets 63, a tool carrying frame 84 similar to the casing 40, said casing 84 being rotated by the gear 75, while the shaft 74 is rotated by the bevel gears 70 and 73. The shaft 74 carries hammers and hammer supporting means similar to those previously described in connection with the first mentioned chisel or planing mechanism.

The brackets 63 may be adjusted vertically by means of the feed-screws 85 which pass through threaded vertical passages in said brackets and carry upon their lower ends the bevel gears 86, which are adapted to be engaged and rotated by the bevel gears 87 carried upon the shaft 88, which may be provided with a crank portion or a handle 89 to adjust the position of the bracket 63.

The tool carrying casings to the sides of the platform 7 may be adjusted either toward or away from the platform 7, as will be readily understood, by means of the racks 29 and 33 and the rack engaging pinions 28 and 32.

It will thus be seen that the above described machine is adapted for planing rocks or boulders of various sizes and forms, mechanism being provided for planing a number of sides at one time. It will also be seen that the entire machine is composed of a comparatively small number of novelly constructed coöperating parts any of which may at any time be removed for repairing or replacing by another part, should such work be necessary, and, it will also be seen that the herein described machine will be highly efficient in operation and durable in use.

What I claim is:

1. A stone working machine comprising a base, a framework carried by said base, a shaft carried by the framework, worm gears upon said shaft, said base and framework having guide channels, movable brackets mounted in said guide channels and adapted for movement transversely of the machine, tool carriers mounted in said bearings, a worm wheel carried by each tool carrier and engaged with one of the worm gears upon the shaft, means for moving the tool carriers and bearings transversely of the machine, tools carried by the tool carriers, means for reciprocating the tools, said worm gear and worm wheel being adapted to operate the tool reciprocating means, and means for rotating the tool carriers.

2. A stone working machine comprising a base, a track carried by the base, a platform movable upon the track, a framework projecting upwardly from the base, movable bearings carried by the base and the framework, rotatable tool carriers mounted between the brackets carried by the base and the brackets carried by the framework, said carriers being composed of ring sections positioned one upon another and secured together, tools mounted between the ring sections of the carriers, a rotatable shaft positioned through each tool carrier, said rotatable shaft carrying disks having roller hammers secured therebetween for engagement against the inner ends of the tools to force the latter outwardly, means for rotating the rotatable carriers at one speed, and means for rotating the shafts carrying the disks and roller hammers at a different speed.

In testimony whereof I have signed my name to this specification in the presence of two subscribing witnesses.

AARON G. SEBERG.

Witnesses:
J. D. ROWLAND,
MARY E. MORRISSEY.

Copies of this patent may be obtained for five cents each, by addressing the "Commissioner of Patents, Washington, D. C."